United States Patent
Addona et al.

(10) Patent No.: US 11,873,915 B1
(45) Date of Patent: Jan. 16, 2024

(54) POPPET VALVE WITH PIVOTABLE SEAL

(71) Applicant: United States of America as represented by the Administrator of NASA, Washington, DC (US)

(72) Inventors: Brad M. Addona, Huntsville, AL (US); James A. Richard, Grant, AL (US); Maegan Rinehart Dawson, Iuka, MS (US); William Francis Sadowski, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/566,068

(22) Filed: Dec. 30, 2021

(51) Int. Cl.
*F16K 25/00* (2006.01)
*F16K 1/38* (2006.01)

(52) U.S. Cl.
CPC ............. *F16K 25/00* (2013.01); *F16K 1/38* (2013.01)

(58) Field of Classification Search
CPC .................................. F16K 25/00; F16K 1/38
See application file for complete search history.

(56) References Cited

U.S. PATENT DOCUMENTS

| | | | |
|---|---|---|---|
| 2,482,223 A | 9/1949 | Strid | |
| 2,713,986 A | 7/1955 | Suthann | |
| 2,840,336 A | 6/1958 | Suthann | |
| 3,525,359 A * | 8/1970 | Short | F16K 31/52 251/303 |
| 3,906,993 A | 9/1975 | Adams et al. | |
| 4,338,689 A * | 7/1982 | Zieg | F16K 25/00 251/335.1 |
| 4,356,998 A * | 11/1982 | Bach | F16L 27/04 285/261 |
| 4,586,464 A * | 5/1986 | Agerley | A01K 7/06 119/72.5 |
| 4,742,845 A * | 5/1988 | Capoccia | F02M 69/54 251/87 |
| 6,978,800 B2 | 12/2005 | deCler et al. | |
| 7,677,531 B1 * | 3/2010 | Hollars | F16K 25/00 251/339 |
| 8,365,756 B2 * | 2/2013 | Kobayashi | B60K 15/03519 137/202 |
| 8,757,592 B2 * | 6/2014 | Marica | F04B 37/14 251/294 |
| 9,639,093 B2 | 5/2017 | Morgan | |
| 9,835,256 B2 | 12/2017 | Bregazzi et al. | |

(Continued)

OTHER PUBLICATIONS

U.S. Appl. No. 12/170,142, filed Nov. 5, 2009, Wingett et al.

*Primary Examiner* — Matthew W Jellett
*Assistant Examiner* — Christopher D Ballman
(74) *Attorney, Agent, or Firm* — Jerry L. Seemann; Trenton J. Roche

(57) ABSTRACT

A poppet valve apparatus has a valve body with an aperture rimmed by a first sealing surface, and a valve stem with an axially oriented cup at its tip with a spring disposed within the cup. The valve plate includes a sealing surface at its perimeter and also has a central pocket which receives a spheroid. The valve stem passes through a collar which is affixed to the valve plate to trap the spheroid beneath the spring so that the plate is pivotably coupled to the valve stem and also tolerates radial and lateral excursion to allow the valve plate to self-align and seal within the valve seat.

20 Claims, 3 Drawing Sheets

(56) References Cited

U.S. PATENT DOCUMENTS

| | | | |
|---|---|---|---|
| 10,120,395 B2 * | 11/2018 | Ishida | F16K 1/2042 |
| 10,598,295 B2 * | 3/2020 | Haeusser | B60T 8/363 |
| 10,619,744 B2 * | 4/2020 | Glime, III | F16K 1/12 |
| 2002/0074043 A1 * | 6/2002 | Beyer | F16K 47/00 |
| | | | 137/587 |
| 2005/0145812 A1 * | 7/2005 | Kumar | F16K 31/10 |
| | | | 251/129.15 |
| 2007/0069166 A1 * | 3/2007 | Sisk | F16K 31/0689 |
| | | | 251/64 |
| 2013/0092860 A1 * | 4/2013 | Kiku | F16K 1/36 |
| | | | 251/314 |

* cited by examiner

POPPET VALVE WITH PIVOTABLE SEAL

ORIGIN OF INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD

The invention relates to poppet valves for sealing, retention, and controlled releases of gases or fluids from containers where a pressure differential exists between the stored fluids and the exterior of the container.

BACKGROUND

Valves used on spacecraft for long duration missions must have extremely low leakages in order for the mission to be successful. Because missions may last for years, leakages of propellants from the vehicle storage tanks even at rates considered acceptable for current space craft or launch vehicles will result in loss of tons of propellants over that time span.

One common cause of poppet valve leaks has been discovered to occur from the seat seal being misaligned or out of perpendicularity of with the poppet. In traditional valves this alignment may be controlled through tight tolerances across several mechanical interfaces, bolted or welded joints, machined part surfaces, and other precisely toleranced features.

Even recently, despite tightly controlled and exacting machining and production, leaks on the order of a few hundred standard cubic centimeters per minute (sccm) have been observed. Such a leakage rate would result in tens of tons of propellent loss over the life of some of the planned Mars missions, requiring an entire extra tank of propellant to be launched to have enough to complete the mission. Launching such an extra tank would add billions of dollars to the cost of such a mission.

BRIEF DESCRIPTION

A primary objective of the invention is to provide a valve for a fluid container.

Another objective of the invention is to reduce leakage rates and fluid loss as much as possible while the valve is desired to be in a closed state, which may present advanced challenges for the retention of liquified gas at extremely low temperatures and especially while the container is deployed in the vacuum of space.

A corollary objective of the invention is to provide a valve mechanism capable of shock and vibration loads during a launch, and enduring temperature extremes for long periods of time in the space environment.

Another corollary objective of the invention is to reduce mission cost by reducing the total mass of components and stored propellants required to be launched into space for a long duration mission.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

Figure 1A:
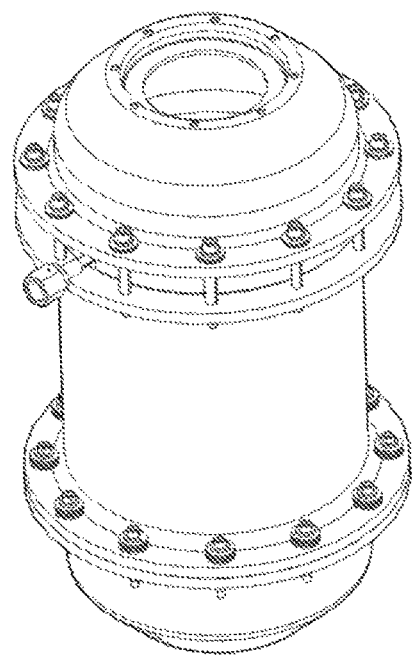
FIG. 1a shows an oblique, top front side view of an embodiment of a fluid container equipped with a poppet valve system in accordance with the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention relates to a poppet valve and seat system which provides a pivotable valve plate also capable of radial excursion from the axis of the valve stem, so that registration of the valve plate sealing surface to the valve seat is self-aligning during closure.

For all figures, reference numerals and reference letters for elements described in any one figure represent the same elements as they appear and are referenced in any other figures, without requiring redundant recitation of the same description in those other figures.

Referring to the figures, FIG. 1a shows an oblique, top front side view of an embodiment of a fluid container equipped with a poppet valve system in accordance with the invention. This figure is provided as a reference for an application of the invention. The valve components disclosed reside within the container shown.

Figure 1C:
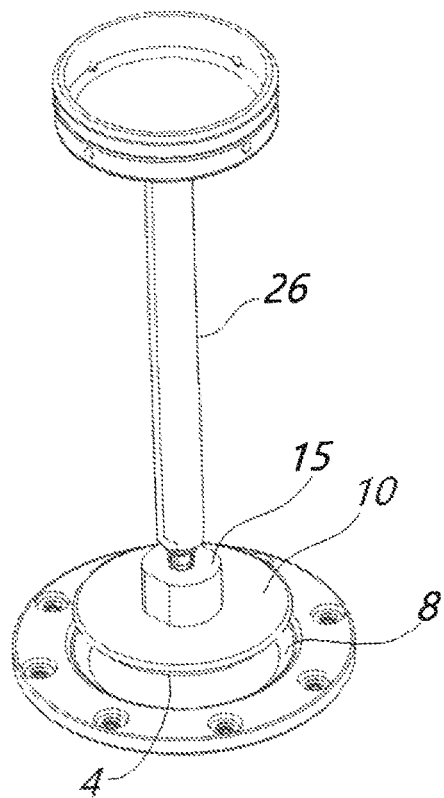
FIG. 1c shows an oblique, top front side view of the piston and components of the poppet valve plate assembly and valve seat assembly of the system shown in FIG. 1b.
Figure 1B:
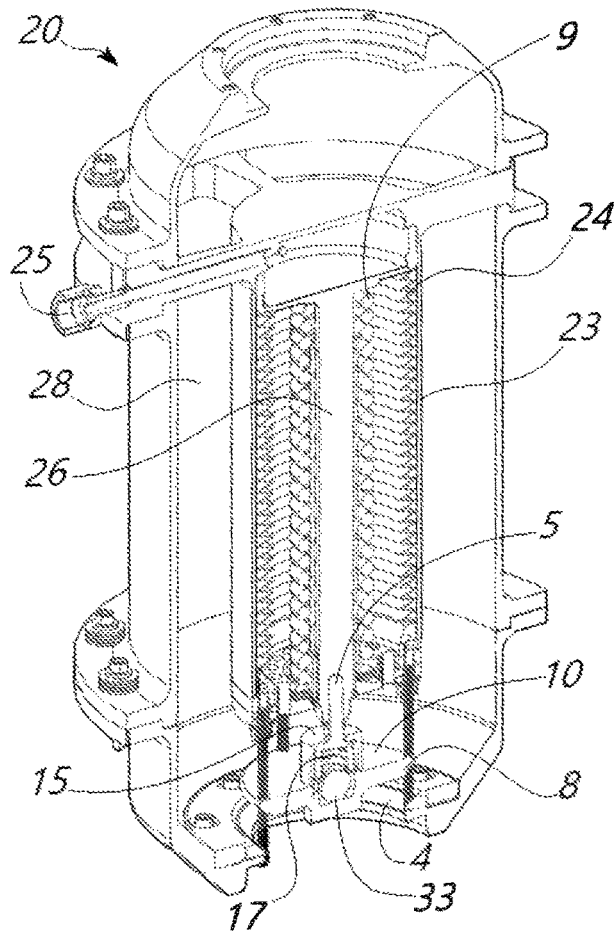
FIG. 1b shows a cutaway view of the fluid container and valve system of FIG. 1a, revealing components of an embodiment of a poppet valve system in accordance with the invention.

FIG. 1b shows a cutaway view of the fluid container and valve system of FIG. 1a, revealing components of an embodiment of a poppet valve system [20] in accordance with the invention. The poppet valve assembly includes a piston [26] which operates a rigid valve stem [5] with a valve stem plate [10] pivotable about a ball bearing or a similar central, spheroidal surface or object [33]. The valve body includes a valve seat [4] as a first sealing surface which receives a second sealing surface [8] along the perimeter of the valve plate. The valve stem includes an axially oriented cup at its tip which houses a compression spring [17] that bears upon the upper portion of the ball as the valve closes. The ball bearing resides within a cavity in the valve plate and the ball and the tip portion of the valve stem are trapped within a collar [15] having a central aperture through which the shank portion of the valve stem passes.

A portion of the piston [26] resides within the coils of an actuator spring [9.] When an actuating fluid such as a gas or hydraulic fluid is introduced at pressure into an actuator fluid inlet [25,] the pressure of the actuating fluid acts against the surface of the piston in its cylinder [23] to overcome the compression force in the actuator spring. The piston is then able to descend and seat the valve plate into the valve seat. Fluids or gases remaining in the containment volume [28] will remain stored in the container as long as pressure at [25] is maintained. When it is desired to release the stored fluid, actuator fluid pressure is reduced and the actuator spring raises the piston so the plate may also rise out of its seated and sealed position. The piston and actuator spring are protected and excluded from interaction with the stored fluid or gas by a flexible, axially collapsible bellows [24] which is beneficial when the container is used for storing caustic, reactive, or high-purity materials.

FIG. 1c shows an oblique, top front side view of the piston [26] and components of the poppet valve plate assembly and valve seat assembly of the system shown in FIG. 1b. The valve seat presents a sealing surface [8] to a perimeter sealing surface [4] along the rim of the poppet valve plate [10,] and the pivotable mechanism of the plate assembly resides within a collar [15] which may be threadably coupled to the valve plate or permanently affixed to it such as by brazing, soldering or welding. According to an alternative embodiment, the collar may include a flange with a hole pattern for registration to and attachment by threaded fasteners to a complementary pattern of threaded apertures in the upper surface of the valve plate. Seals such as o-rings or similar glands and gaskets may also be incorporated to seal the pivotable components residing within the collar from the gas or fluid stored in the container.

Figure 2A:
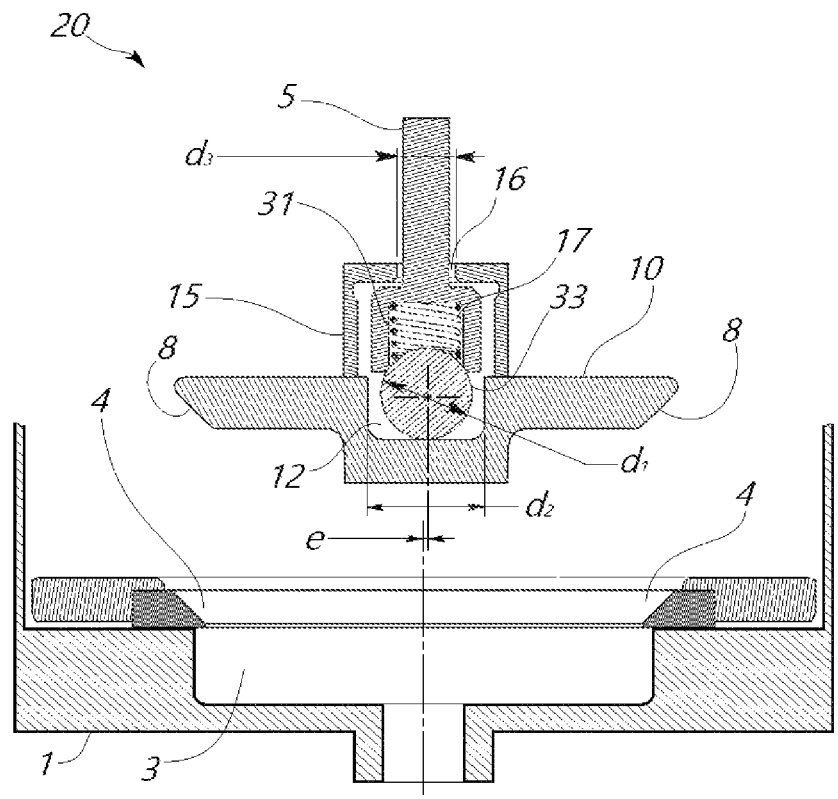
FIG. 2a shows a cross section of the poppet valve system of FIG. 1b in an open condition and some coaxial misalignment between the poppet valve assembly and the valve seat, which will self-correct upon closure of the valve.

FIG. 2a shows a cross section of the poppet valve system of FIG. 1b in an open condition, and with some coaxial misalignment [e] between the axis of the poppet valve assembly components and the central axis of the valve seat. The valve system is designed to be self-aligning so that such eccentricity will self-correct upon closure of the valve. The poppet valve apparatus [20] includes a valve body [1] with an aperture [3] for egress for the stored fluids or gases, and a first sealing surface [4] which may be a conical surface like a countersink, or may be a spherical surface.

The valve stem [5] includes an axially oriented cup [31] at its tip, and a compressible member such as a helical spring installed within the cup. A valve plate[10] comprises a perimeter which is a second sealing surface[8] registerable with the first sealing surface of the valve seat. The plate has a central cavity [12] which contains a spheroid [33] such as a ball bearing in the cavity, with the rim of the cup and its internal spring located to bear down upon it when the valve stem is depressed. As shown in FIG. 2a, the central cavity [12] is shaped to create a single point of contact between the spheroid [33] and the valve plate [10] such that the second sealing surface [8] of the valve plate is pulled against the first sealing surface [4] of the valve body when the poppet valve is closed.

With the spheroid having a first diameter [d1] and the central cavity having a portion with an internal, second diameter [d2] greater than the ball diameter such that an annular clearance is created between the spheroid [33] and the central cavity [12], and a collar [15] affixed to the plate to close over the cavity except for a central aperture of a third diameter [d3] where the valve stem passes through the collar, the collar aperture is less than said first diameter, so both the ball and cup end of the valve stem are trapped within the cavity, and the plate is both pivotably and rotatably coupled to the valve stem and able to translate laterally or radially so that the complementary valve sealing surface and the valve seat surface may register and self-align with each other as the valve plate is forced to close. A portion of the ball will also self-center within the cup as the compliant members of the assembly compress from the down-ward closing force applied to the valve stem. The valve plate as a comparatively thin membrane may also locally deform and conform to seal against the valve seat surface.

Figure 2B:
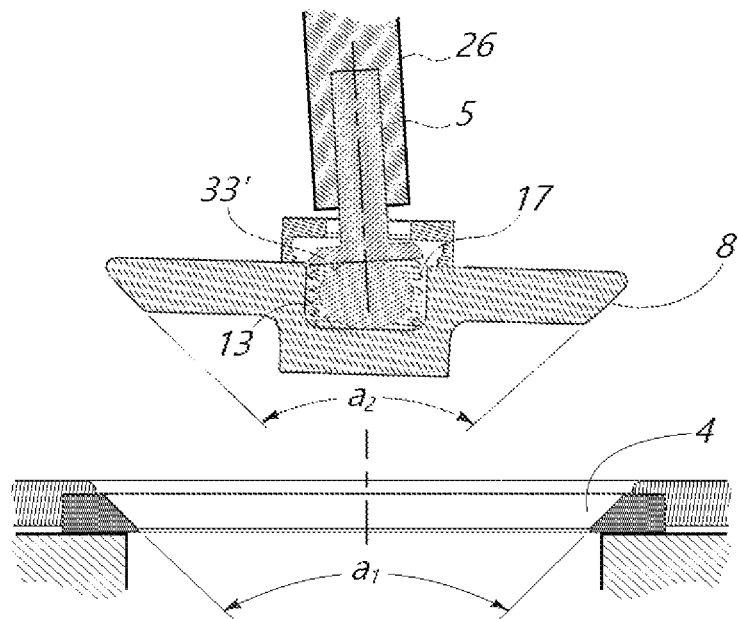
FIG. 2b shows a cross section of an alternative configuration of components for a self-aligning poppet valve system in accordance with the invention, and with an angular misalignment of the valve stem, which will self-correct upon closure of the valve.

FIG. 2b shows a cross section of an alternative configuration of components for a self-aligning poppet valve system in accordance with the invention shown with an angular misalignment of the valve stem which will self-correct upon closure of the valve. Some axial misalignment, such as of the valve stem [5] axis or the line of action of the piston [26] being skew with respect to a central axis defined by the valve seat sealing surface [4] will self-correct as the plate is brought down into the valve seat because the plate and its sealing surface [8] are pivotably coupled to the valve stem. Although a sphere is preferable for the spheroid, it is also within the scope of the invention to use an oblate spheroid [33'] as the pivot ball in the valve stem cavity.

In this embodiment the valve stem ends with an end plate rather than a cup, and the compressible member [17] is a helical spring with a coil diameter commensurate with the valve stem end plate, and with the pivot ball disposed within a central cavity of the plate and within the coils of the spring, with both the spring and ball sandwiched between the end plate of the valve stem and an end face or bottom face [13] of the cavity in the plate.

The valve seat is a first surface and preferably a conic surface having a first conical angle [$a_1$,] and the perimeter of the valve plate includes a second sealing surface which preferably is also a complementary conical surface having a second conical angle [$a_2$.] Although the conical angles may be equal or nearly so, it is also within the scope of the invention to have the second conical angle be more acute than the first conical angle, so that the sealing interface is a circular edge contact residing at the lower extreme of the valve plate sealing surface. Local, complementary deformations of materials at this interface complete the seal even as a low-eccentricity ellipse slightly non-coaxial to the central axis of the valve seat, and the contact interface broadens under pressure from a theoretical edge contact into a narrow band of contact.

As additional alternatives within the scope of the invention, it is also possible to create a theoretical edge contact that similarly broadens into a sealing band within the valve seat by having the valve perimeter be a spherical surface that seats into a valve seat surface which is either conical or another spherical surface which has a larger radius than the spherical sealing surface of the valve plate perimeter.

Figure 3:
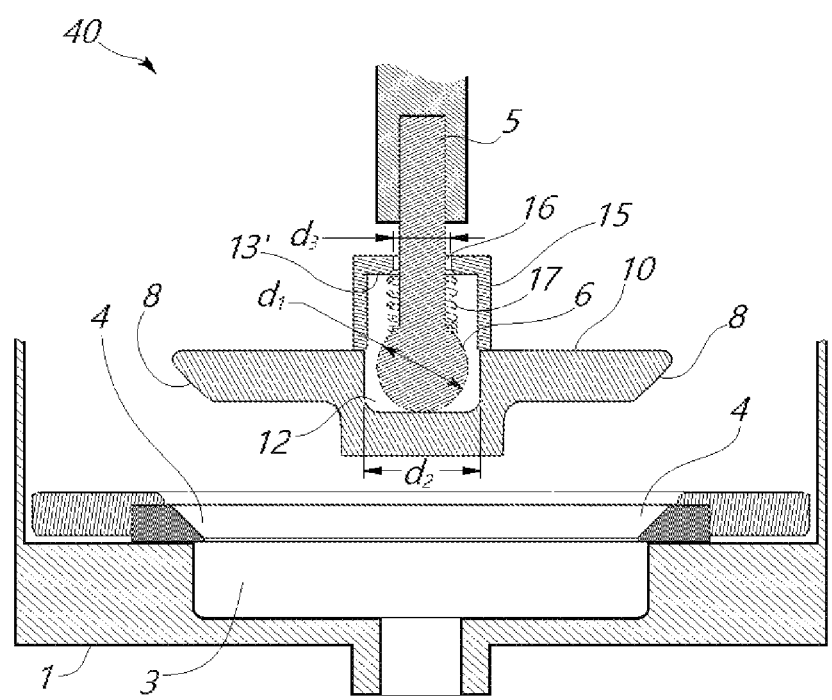
FIG. 3 shows a cross section of another alternative configuration of components for a poppet valve system in accordance with the invention.

FIG. 3 shows a cross section of another alternative configuration of components for a self-aligning poppet valve apparatus [40] in accordance with the invention. The valve body [1] has an aperture [3] for the egress of stored gases or fluids, and also comprises a first sealing surface [4]. The piston connects to a valve stem [5], but instead of a ball as a separate component, in this embodiment the valve stem end includes a first spherical surface [6] of a first external diameter [d1] at its tip.

The valve plate [10] has a perimeter which is a second sealing surface [8] registerable with the first sealing surface in the valve body. The valve plate also includes a central cavity [12] with a portion having an internal surface of a second diameter [d2] greater than the first diameter of the valve stem end such that an annular clearance is created between the first spherical surface [6] of the valve stem and the central cavity [12]. A collar [15] has a central aperture [16] of a third diameter [d3] less than the first diameter of the valve stem end so that with the valve stem passing through the central aperture of the collar, the first spherical surface or ball end of the valve stem is received within the plate cavity. The ball end is pushed to the floor of the plate cavity by a compressible member [17] which is a helical spring disposed coaxially about the valve stem and residing between the spherical surface of the valve stem and an end face [13'] of the collar. Since the floor of the plate cavity is below the second sealing surface when the poppet valve is closed, the second sealing surface is pulled against said first sealing surface.

With the collar attached to said plate, the valve stem ball end and the spring are trapped within the collar and the valve plate cavity. The plate is both pivotably and rotatably coupled to the valve stem and will also allow some radial or lateral excursion.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A self-aligning poppet valve apparatus comprising
a valve body having an aperture comprising a first sealing surface,
a rigid valve stem having a first spherical surface of a first external diameter at its tip,
a plate comprising
  a perimeter which is a second sealing surface registerable with said first sealing surface,
  a central cavity with a portion having an internal surface of a second diameter greater than said first diameter such that an annular clearance is created between said first spherical surface and said internal surface, and
  a collar having a central aperture of a third diameter less than said first diameter, such that with
said valve stem passing through said central aperture of said collar,
said first spherical surface received within said plate cavity, and
said collar attached to said plate,
said plate is pivotably coupled to said valve stem while allowing radial excursion of said plate with respect to said first spherical surface.

2. The self-aligning poppet valve apparatus of claim 1, wherein said first sealing surface is a first conic surface having a first conical angle and said second sealing surface is a second conic surface having a second conical angle.

3. The self-aligning poppet valve apparatus of claim 2, wherein said second conical angle is more acute than said first conical angle.

4. The self-aligning poppet valve apparatus of claim 1, wherein said first sealing surface is a conic surface having a first conical angle and said second sealing surface is a spherical surface.

5. The self-aligning poppet valve apparatus of claim 1, wherein said plate is also rotatably coupled to said valve stem.

6. The self-aligning poppet valve apparatus of claim 1, further comprising a compressible member disposed between said spherical surface of said valve stem and said collar.

7. The self-aligning poppet valve apparatus of claim 6, wherein said compressible member is a helical spring disposed coaxially about said valve stem.

8. The self-aligning poppet valve apparatus of claim 1, further comprising a compressible member disposed between said spherical surface of said valve stem and an end face of said collar.

9. The self-aligning poppet valve apparatus of claim 8, wherein said compressible member is a helical spring.

10. The self-aligning poppet valve apparatus of claim 1, wherein said first spherical surface received within said plate cavity is only in contact with said plate cavity at a single point such that said second sealing surface can be pulled against said first sealing surface.

11. A self-aligning poppet valve apparatus comprising
a valve body having an aperture comprising a first sealing surface,
a rigid valve stem comprising an axially oriented cup at its tip,
a spheroid having a first diameter,
a plate comprising
a perimeter which is a second sealing surface registerable with said first sealing surface,
a central cavity with a portion having an internal surface of a second diameter greater than said first diameter such that an annular clearance is created between said spheroid and said internal surface, and
a collar having a central aperture of a third diameter less than said first diameter, such that with
said valve stem passing through said central aperture of said collar,
said spheroid received both within said plate cavity and within said valve stem cup, and
with said collar attached to said plate,
said plate is pivotably coupled to said valve stem while allowing radial excursion of said plate with respect to said first spherical surface.

12. The self-aligning poppet valve apparatus of claim 11, wherein said spheroid is an oblate spheroid.

13. The self-aligning poppet valve apparatus of claim 11, wherein said first sealing surface is a first conic surface having a first conical angle and said second sealing surface is a second conic surface having a second conical angle.

14. The self-aligning poppet valve apparatus of claim 13, wherein said second conical angle is more acute than said first conical angle.

15. The self-aligning poppet valve apparatus of claim 11, wherein said first sealing surface is a conic surface having a first conical angle and said second sealing surface is a spherical surface.

16. The self-aligning poppet valve apparatus of claim 11, wherein said plate is also rotatably coupled to said valve stem.

17. The self-aligning poppet valve apparatus of claim 11, further comprising a compressible member disposed between said spherical surface of said valve stem and said collar.

18. The self-aligning poppet valve apparatus of claim 17, wherein said compressible member is a helical spring disposed coaxially about said valve stem.

19. The self-aligning poppet valve apparatus of claim 11, further comprising a compressible member disposed between said spherical surface of said valve stem and an end face of said central cavity in said plate.

20. The self-aligning poppet valve apparatus of claim 19, wherein said compressible member is a helical spring.

* * * * *